(12) United States Patent
Khrais

(10) Patent No.: US 7,221,682 B2
(45) Date of Patent: May 22, 2007

(54) CONTROLLER FOR ALLOCATION OF PROCESSOR RESOURCES AND RELATED METHODS

(75) Inventor: Nidal N. Khrais, Flanders, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 1034 days.

(21) Appl. No.: 10/198,011

(22) Filed: Jul. 18, 2002

(65) Prior Publication Data

US 2004/0013106 A1 Jan. 22, 2004

(51) Int. Cl.
*H04J 3/16* (2006.01)

(52) U.S. Cl. ..................... 370/465; 370/468
(58) Field of Classification Search ............. None
See application file for complete search history.

(56) References Cited

U.S. PATENT DOCUMENTS

| | | | |
|---|---|---|---|
| 6,347,091 B1 | 2/2002 | Wallentin et al. | 370/437 |
| 6,374,117 B1 | 4/2002 | Denkert et al. | 455/522 |
| 6,618,591 B1* | 9/2003 | Kalliokulju et al. | 455/452.2 |
| 6,816,456 B1* | 11/2004 | Tse-Au | 370/230.1 |
| 2002/0045458 A1 | 4/2002 | Parantainen et al. | 455/466 |
| 2003/0189900 A1* | 10/2003 | Barany et al. | 370/229 |
| 2003/0208582 A1* | 11/2003 | Persson et al. | 709/223 |
| 2004/0105393 A1* | 6/2004 | Ronneke et al. | 370/252 |
| 2004/0156341 A1* | 8/2004 | Cheng et al. | 370/335 |
| 2004/0205752 A1* | 10/2004 | Chou et al. | 718/100 |

OTHER PUBLICATIONS

3GPP TS 23.107 v3.8.0, 3GPP, QoS Concept and Architecture (Release 1999), Mar. 2002, pp. 1-4.*

* cited by examiner

Primary Examiner—Chau Nguyen
Assistant Examiner—Jung Park

(57) ABSTRACT

A controller 26 for a packet radio network 20 includes a processor 27 that, in turn, includes a plurality of processor resources 30A–30D for processing a plurality of packet classes. Each packet class has a different delay sensitivity associated therewith. The processor 27 allocates to each packet class at least a portion of at least one processor resource 30A–30D, the allocation being based on the delay sensitivities associated with each packet class. Each processor resource 30A–30D may have a processing threshold, and the processor 27 may determine, based upon arriving packets, whether at least one processor resource will exceed its processing threshold, thus defining at least one overloaded processor resource 30A. The processor 27 may reallocate at least a portion of at least one processor resource to process packets for the at least one overloaded processor resource 30A thereby defining at least one reallocated processor resource 30D.

18 Claims, 4 Drawing Sheets ced by the at least one overloaded processor resource. The processor may reallocate at
CONTROLLER FOR ALLOCATION OF PROCESSOR RESOURCES AND RELATED METHODS

FIELD OF THE INVENTION

This invention relates to the field of communications networks, and, more particularly, to packet radio networks.

BACKGROUND OF THE INVENTION

Data packetizing is a technique for segmenting data into shortened sections referred to as packets. Each packet can be forwarded over a communications network whenever it is ready for transmission, independent of the remaining data. A packet radio network typically relies on a controller comprising at least one processor having a plurality of processor resources for processing packets that are to be transmitted and received over such a network. Such packets normally carry information and include header information for processing and routing. Each packet typically can be identified with a packet class, each packet class having a different delay sensitivity.

Delay sensitivity relates to how much delay can be tolerated between the arrival of successive packets. For example, successive packets carrying voice or video data should arrive in close succession so that the information is received by a hearer or viewer at the packets' destination as though it was being heard or seen in real or near-real time. Accordingly, the packet classes, often referred to, respectively, as conversational and streaming classes, are very delay sensitive. Another packet class, for example, comprises packets of interactive data carried over the Internet. Still another comprises packets of non-interactive data, such as e-mails. The corresponding packet classes, respectively, are commonly referred to as interactive and background classes. Both are much less delay sensitive.

Increasingly, a packet radio network carrying a plurality of packet classes is incorporated in a broader system that also comprises a core network, including circuit switched and packet switched domains, as well as user equipment such as mobile phones and wireless laptops. Such a system is the Universal Mobile Telecommunications System (UMTS), a third-generation (3G) system intended to provide global mobility with a wide range of services that include telephony, paging, messaging, Internet and broadband data communication services.

The UMTS network provides end-to-end service, from user equipment (UE) to other UE and/or other devices connected to wire line networks. Earlier generations of networks were originally designed for so-called "best effort" service, wherein a best effort would be made to deliver a packet but without any assurance that it would arrive at its destination as intended. An end-to-end service, however, has associated with it a certain Quality of Service (QoS) that is to be provided to a network user. The QoS should satisfy the user's demands, not merely be a best attempt. Moreover, the service should satisfy the demands of diverse groups of users.

One proposed approach for avoiding overloads in such a packet communication network involves determining whether a received message is among a class that is being received with a frequency that exceeds a threshold. If so the message is simply discarded. Although this may avoid an overload, it does not enhance the efficiency with which the network receives and processes message.

SUMMARY OF THE INVENTION

It is therefore an object of the present invention to provide a controller and related methods for more efficiently processing a plurality of packet classes, each packet class having a different delay sensitivity associated with the packets of the packet class.

This and other objects, features, and advantages in accordance with the present invention are provided by a controller for efficiently allocating processor resources to process the plurality of packet classes. The controller may comprise a processor, which, in turn, comprises a plurality of processor resources for processing a plurality of packet classes. Each packet class may have a different delay sensitivity associated therewith. The processor may allocate to each packet class at least a portion of at least one processor resource based upon the delay sensitivities.

The processor may initially allocate each processor resource to a respective packet class. Each processor resource may have a respective processing threshold. The processor may determine, based upon arriving packets, whether at least one processor resource will exceed its processing threshold, thereby defining at least one overloaded processor resource. The processor may reallocate at least a portion of at least one processor resource to process packets for the at least one overloaded processor resource, thereby defining at least one reallocated processor resource.

The at least one reallocated processor resource may initially be for a packet class having a lower delay sensitivity than a packet class of the at least one overloaded processor resource. The portion of at least one processor resource reallocated to process packets for the at least one overloaded processor resource may comprise a portion that is determined based on the delay sensitivity associated with the packet class processed by the at least one overloaded processor resource and the delay sensitivity associated with the packet class initially to be processed by the at least one reallocated processor resource.

The portion of at least one processor resource reallocated to process packets for the at least one overloaded processor resource, more particularly, may be determined based on a ratio R of a first numerical value and a second numerical value.

The first numerical value may correspond to the delay sensitivity associated with the packet class processed by the at least one overloaded processor resource. The second numerical value may correspond to the delay sensitivity associated with the packet class initially to be processed by the at least one reallocated processor resource.

Using the ratio R, the portion of at least one processor resource reallocated to process packets for the at least one overloaded processor resource may also be determined based on a solution to a system of equations comprising a first equation, $R=a_1/a_2$, and a second equation, $a_1+a_2=TP_{1+2}$, where $a_1$ is a number of units corresponding to the at least one overloaded processor resource; $a_2$ is a number of units corresponding to the at least one reallocated processor resource; and $TP_{1+2}$ is a total number of units.

The processor may halt on-going processing of packets belonging to the packet class that initially is to be processed by the at least one reallocated processor. Halting the on-going processing may be done by the processor as needed to thereby make available the desired portion of at least one processor resource so that the portion is available for processing packets for the at least one overloaded processor resource. The processor further may tag packets whose on-going processing has been halted. Packets that have been tagged may be queued for subsequent processing after they have been tagged.

According to an alternate embodiment, the processor instead may tag arriving packets that are to be processed by the at least one reallocated processor. The tagged packets may be queued for subsequent processing when on-going processing of packets by the at least one reallocated processor has been completed.

Another aspect of the invention relates to a method for allocating processor resources to process a plurality of packet classes carried by a packet radio network, wherein each packet class has a different delay sensitivity associated therewith. The method may include allocating to each packet class at least one processor resource of a processor comprising a plurality of processor resources based on the delay sensitivities.

Each processor resource may be initially allocated to a respective packet class and may have a respective processing threshold. The method thus may further comprise determining, based upon arriving packets, whether at least one processor resource will exceed its processing threshold, thereby defining at least one overloaded processor resource. If so, at least a portion of at least one processor resource is reallocated to process packets for the at least one overloaded processor resource, thereby defining at least one reallocated processor resource.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Prime notation indicates different embodiments of similar elements.

Figure 1:
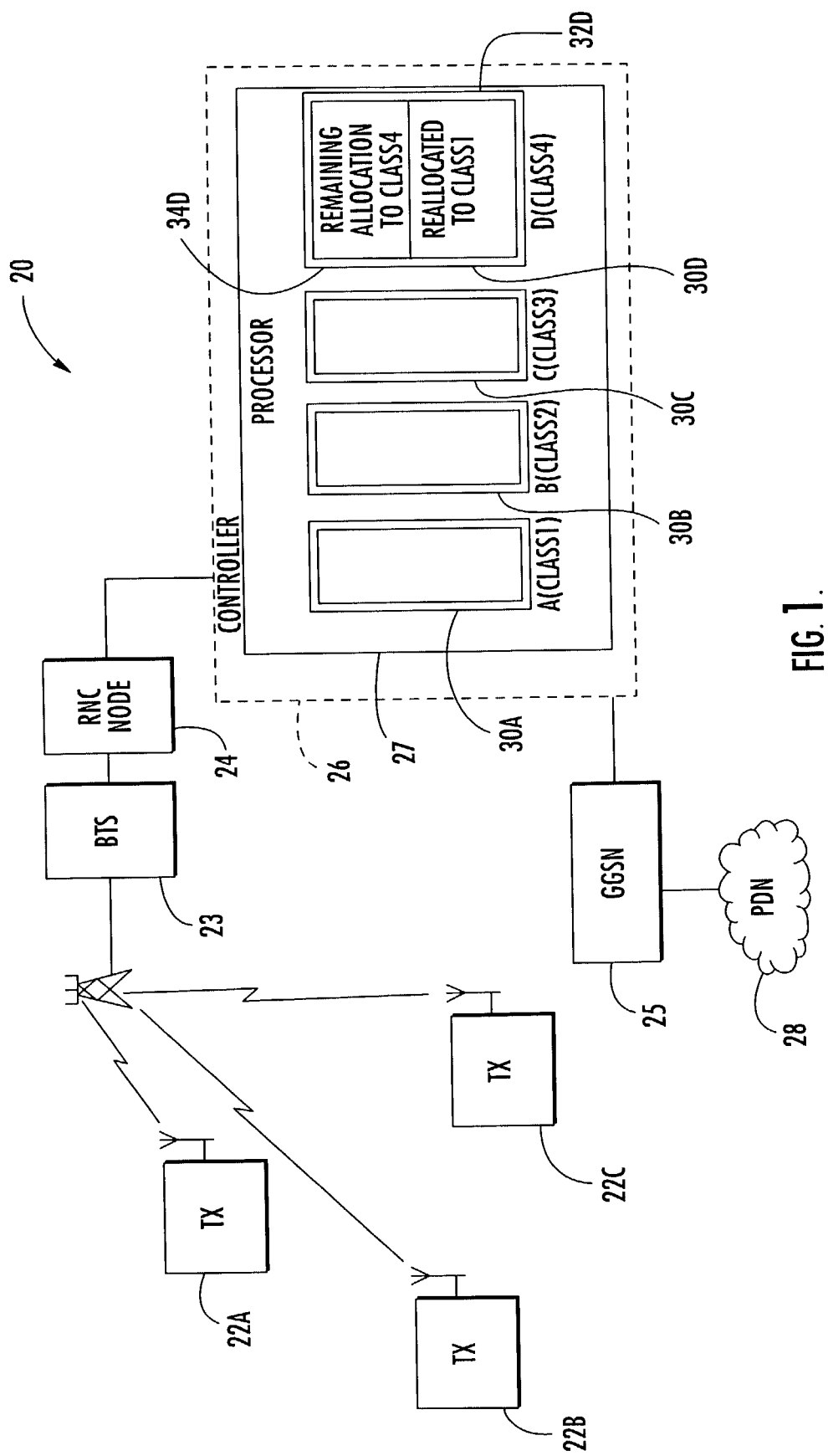
FIG. 1 is a packet radio network including a controller for the packet radio network according to the present invention

Referring initially to FIG. 1, a packet radio network 20 is described. The packet radio network 20 comprises a plurality of transceivers 22–22C and at least one base transceiver station, or BTS, 23 that communicates with each transceiver. A radio network control node, or RNC node, 24 is connected to the at least one BTS 23. As will be readily appreciated by those skilled in the art, the RNC node 24 may connect to a plurality of such base transceiver stations.

The packet radio network 20 further comprises a controller 26 that is connected to the RNC node 24. The controller 26 is illustratively connected to a gateway GPRS (General Packet Radio Service) support node, or GGSN, 25. The GGSN, in turn, is illustratively connected to a packet data network, or PDN, 28. As will be readily understood by those skilled in the art, the GGSN may also connect to various other types of networks as well.

As will also be readily understood by those skilled in the art, data may be communicated over the packet radio network 20 in packetized form; that is, data may be segmented into shortened sections comprising packets. Each packet can be communicated over the packet radio network 20 independently of the remaining data.

The controller 26 comprises a processor 27, which, in turn, comprises a plurality of processor resources 30–30D for processing packets, wherein each packet belongs to one of a plurality of packet classes. Each packet class has a different delay sensitivity associated therewith. Delay sensitivity, as will be readily understood by those skilled in the art, relates to how much delay can be tolerated between the arrivals of successive packets.

The processor 27 allocates at least a portion of at least one the processor resources 30–30D to each packet class. The allocation is based on the delay sensitivities associated with each of the packet classes. Illustratively, each processor resource 30–30D is initially allocated to a respective packet class and has a respective threshold defining a processing threshold. The processing threshold corresponds to the processing capacity of the respective processor resource. As will be readily understood by one skilled in the art, the processing threshold may correspond to a maximum processing capacity of the processor resource, or alternately, it may correspond to some portion thereof.

Figure 2:
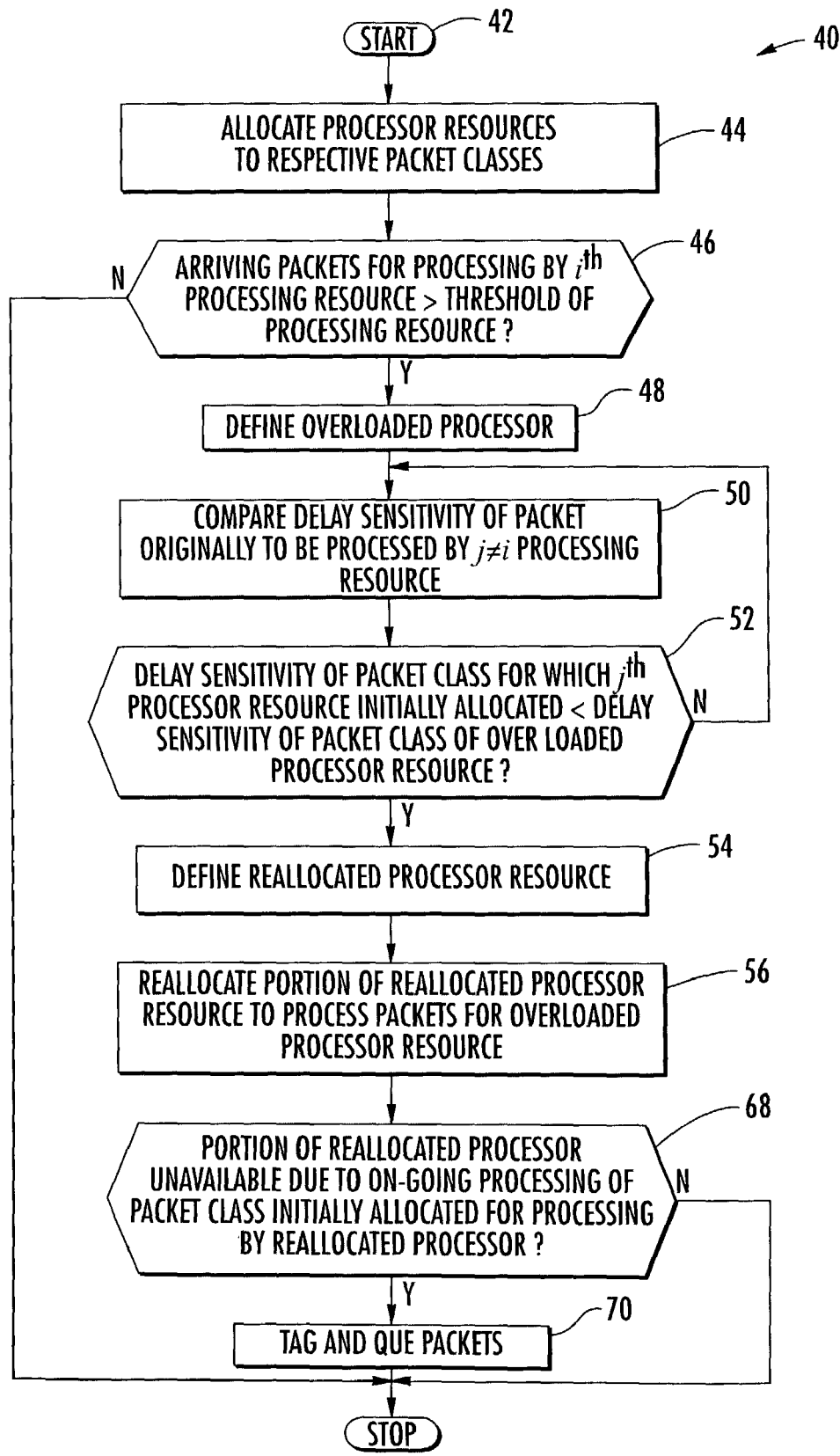
FIG. 2 is flow chart of the allocation of processor resources using the controller of FIG. 1.

Referring additionally now to FIG. 2, the operations 40 of the processor 27 are described. The processor 27 after the start (Block 42) initially allocates each processor resource 30–30D to a respective packet class (Block 44). After the initial allocation as packets arrive, the processor 27 at Block 46 determines, based upon the arriving packets, whether at least one processing resource 30–30D will exceed its processing threshold, thereby defining at least one overloaded processor resource (Block 48). Illustratively, arriving packets belonging to class 1 exceed the processing threshold of processor resource A, which initially is allocated for processing packets belonging to class 1. Accordingly, the processor resource 30A defines an overloaded processor.

When the processor 27 determines that there is at least one overloaded processor, at least a portion of at least one other processor resource, which thereby defines a reallocated processor resource (Block 54), is reallocated for processing packets for the at least one overloaded processor resource (Block 56). Illustratively, a processor resource D defines a reallocated processor resource 30D. The reallocated processor resource 30D initially was allocated to process packets belonging to packet class 4, but upon reallocation, a portion 32D is reallocated to process packets belonging to Class 1. Another portion 34D of the reallocated processor resource 30D remains allocated for processing packets belonging to Class 4.

Illustratively, the at least one reallocated processor resource 30D is initially allocated for processing a packet class (i.e., class 4) having a lower delay sensitivity than the packet class of the at least one overloaded processor resource 30A (i.e., class 1). Accordingly, at Block 50 the delay sensitivity of the packet class originally to be processed by the overloaded processor resource 30A is compared with those of other processor resources initially allocated to process other packet classes. A portion of a processor resource is reallocated if it is determined (Block 52) that the processor resource was initially allocated to process packets belonging to a packet class having a lower delay sensitivity than the packet class of the at least one overloaded processor 30A.

Figure 3:
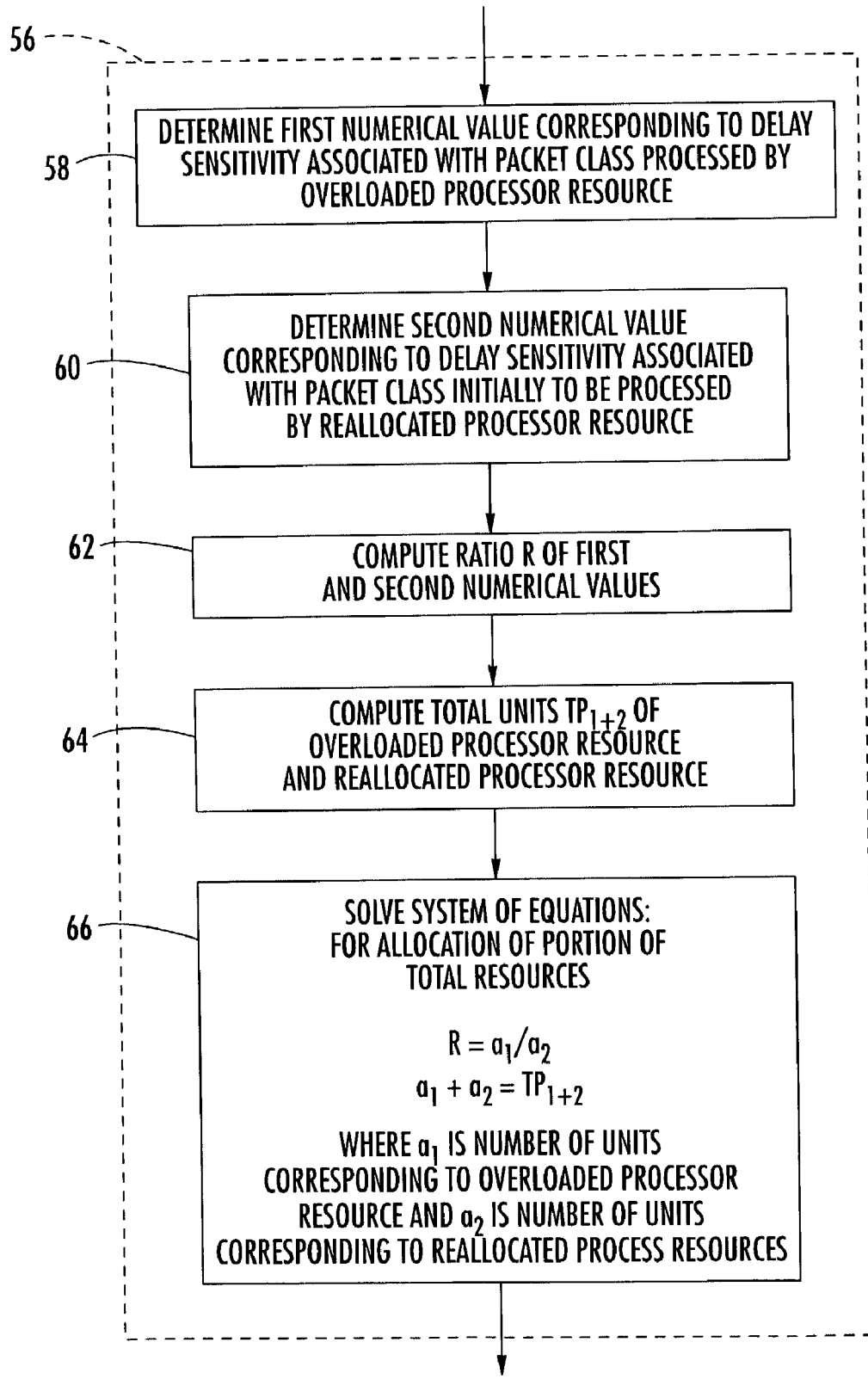
FIG. 3 is a more detailed flow chart of a portion of the flow chart of FIG. 2.

The portion 32D of the at least one reallocated processor resource 30D illustratively comprises a portion determined based on the delay sensitivity associated with the packet class processed by the at least one overloaded processor resource 30A. For example, as illustrated in FIG. 3, reallocating at least a portion of the reallocated processor resource 30D at Block 56 further comprises determining a first numerical value corresponding to the delay sensitivity associated with the packet class processed by the overloaded processor resource 30A (Block 58). At Block 60, a second numerical value corresponding to the delay sensitivity associated with the packet class initially to be processed by the reallocated processor 30D is also determined. A ratio, R, is determined based on the first and second numerical values (Block 62).

Illustratively, the reallocation involves two processor resources—the overloaded and reallocated processor resources 30A, 30D. Accordingly, a total number of units for both is determined at Block 64, and, at Block 66, the following system of equations is solved to determine the portion of the reallocated processor resource 30D to be reallocated for processing packets for the overloaded processor 30A:

$$R = a_1/a_2,$$

$$a_1 + a_2 = TP_{1+2};$$

where $a_1$ is a number of units corresponding to the at least one overloaded processor resource 30A; $a_2$ is a number of units corresponding to the at least one reallocated processor resource 30D; and $TP_{1+2}$ is a total number of units. As will be readily appreciated by those skilled in the art, processor resources may correspond to units of processing time or processing circuitry comprising individually dedicated circuits.

Although, illustratively, the reallocation involves two processor resources—the overloaded and reallocated processor resources 30A, 30D—a portion may be reallocated from more than one reallocated processor resource to thereby process packets for the overloaded processor resource. Accordingly, as will be readily appreciated by one skilled in the art, the above system of equations may be expanded in order to determine a respective portion reallocated from each of the reallocated processor resources.

Figure 4:
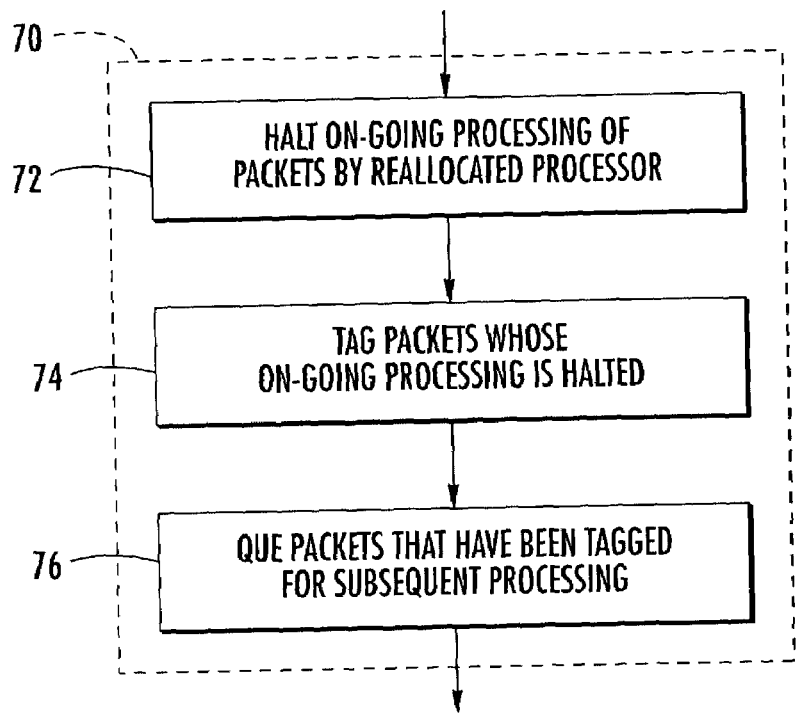
FIG. 4 is a more detailed flow chart of another portion of the flow chart of FIG. 2.

It may be the case at Block 68 that, upon determining that reallocation is desirable, the portion of the processor resource to be reallocated is unavailable due to on-going processing of packets belonging to the packet class for which the reallocated processor resource is initially allocated. With reference to FIG. 4, in one embodiment, the processor 27 responds at Block 70 by halting the on-going processing of packets belonging to the packet class (i.e., class 4) initially to be processed by the reallocated processor 30D (Block 72).

Thus, when the on-going processing of class 4 packets is halted, the desired portion 32D of the reallocated processor 30D is made available to process packets for the overloaded processor resource 30A. At Block 74, packets whose ongoing processing has been halted are tagged for subsequent processing. The packets that have been tagged for subsequent processing are queued at block 76 for processing when the portion 32D of the reallocated processor resource 30D is no longer required for processing packets for the overloaded processor resource 30A.

Figure 5:
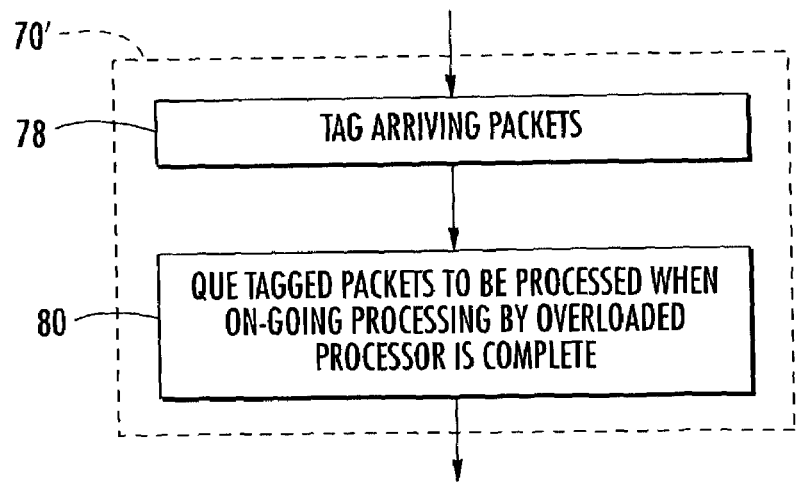
FIG. 5 is a more detailed flow chart representing an alternative embodiment the same portion depicted by FIG. 4.

Referring to FIG. 5, an alternative response 70' of the processor 27 is described for handling the unavailability of the portion 32D of the reallocated processor resource 30D due to on-going processing of packets belonging to the packet class for which the reallocated processor resource initially is allocated. At Block 78, arriving packets that are to be processed using the portion 32D of the reallocated processor resource 30D are tagged for subsequent processing when the on-going processing of packets by the reallocated processor 30D has been completed. The tagged packets are queued at Block 80 for subsequent processing once the on-going processing has been completed.

The controller 26, for example, can be used for the UMTS, a network that provides end-to-end services from one UE to another. A QoS corresponds to the particular end-to-end service that is to be provided to network service users. Because it is the user that decides whether the received QoS is satisfactory, a traffic management strategy better than a conventional best-effort service delivery is needed to meet the demands of UMTS users who typically will be accustomed to landline applications. Such a strategy should also accommodate demands from a diverse group of users. The controller 26 advantageously provides the needed traffic management strategy and accommodates these demands.

The UMTS typically specifies four different QoS packet (or traffic) classes: 1) a conversational class; 2) a streaming class; 3) an interactive class; and, 4) a background class. The primary distinction between the respective classes is their delay sensitivity.

The conversational and streaming classes correspond to real-time traffic flows and, accordingly, are more delay sensitive. Conversational services, such as real-time voice and video telephone services, for example, are the most delay sensitive applications. The interactive and background classes correspond to traditional Internet applications like web browsing and e-mail exchange, and include Telnet, FTP and News data transfers. More delay between the arrivals of packets of such traffic can be accommodated. Owing to their lower delay sensitivities as compared to the conversational and streaming packet classes, both the interactive and background packet classes provide better error rates through channel coding and retransmission.

As between the interactive packet class and the background class, the main difference is that the interactive class pertains to interactive applications (e.g., interactive exchange of e-mail and interactive web browsing), while the background class is used for background traffic (e.g., downloading of e-mails and downloading of various types of data files).

Table 1 illustrates and summarizes four proposed QoS classes for the UMTS.

TABLE 1

UTMS QoS Classes

| Traffic Class | Conversational Class Conversational RT | Streaming Class Streaming RT | Interactive Class Interactive Best Effort | Background Background Best Effort |
|---|---|---|---|---|
| Fundamental characteristics | Preserve time relation (variation) between information entities of the stream Conversational pattern (stringent and low delay) | Preserve time relation (variation) between information entities of the stream | Request response pattern Preserve payload content | Destination is not expecting the data within a certain time Preserve payload content |
| Example of the application | Voice | Streaming video | Web browsing | Background download of emails |

The controller 26 allocates the Serving GPRS Support Node (SGSN) Traffic Processor (TP) resources for the four UMTS services based on the UMTS delay objectives. In general, bandwidth (BW) allocated to class (i)/BW allocated to class (j)=class (j) delay budget/class (i) delay budget. Therefore, it is possible to multiplex UMTS class 1 and class 4 traffic using the controller 26 as already described.

Table 2 shows that class 1 traffic is the most delay sensitive compared to all UMTS classes, whereas class 4 is the least sensitive to delay.

TABLE 2

Summary of Delay Objectives for UMTS

| Bearer | Conversational | Streaming | Interactive | Background |
|---|---|---|---|---|
| UMTS Bearer PAB + CN | 100 ms | 250 ms | 400 ms | ~1000 ms |
| RAB | 80 ms | 200 ms | 320 ms | 800 ms |
| CN Bearer (SGSN to GGSN) | 20 ms | 50 ms | 80 ms | 200 ms |
| Iu | 16 ms | 40 ms | 64 ms | 160 ms |
| Radio | 64 ms | 160 ms | 256 ms | 640 ms |

Note:
RAB delay tolerance is 80% of UTMS delay tolerance, Iu delay tolerance is 20T or RAB delay tolerance.

Therefore, in order to use the available TP resources efficiently and, at the same time, meet the QoS requirements, the controller 26 allocates TP resources based on the respective delay sensitivities of the different classes. More particularly, the controller 26 can allocate the TP resources based on the ratio of the delay sensitivity of class 1 to the delay sensitivity of class 4. For example, using Table 2, the ratio of the SGSN delay tolerances of class 1 and 4 is 10:1, indicating that the delay sensitivity of Class 1 is ten times higher than that of Class 4. Using the delay sensitivities, therefore, traffic can be allocated according to the ratio $a_1=10*a_4$, where $a_1$ and $a_4$ are units of processor resources allocated to class 1 and class 4 traffic, respectively.

If, for example, there are 2 TP units (i.e., one TP unit per each class), then $a_1+a_4=2$ (i.e., class 1+class 4 resources=2 TP units). Thus, solving the two equations $a_1+a_4=2$ and $a_1=10*a_4$ yields $a_4=(2/11)*100=18\%$ of the 2 TP units, corresponding to the portion of processor resources to be allocated to class 4 traffic, and $a_1=(9/11)*100=82\%$ of the two TP units, corresponding to the portion of processor resources to be allocated to class 1 traffic. Thus if 1 TP unit is initially allocated for class 1 calls and 1 TP unit for class 4 calls, then 82% of the TP resources initially allocated for class 4 will be reallocated to process class 1 calls if the TP resources of class 1 are busy. The availability of the 82% of class 4 TP resources is achieved by preempting class 4 traffic.

The scheme is based on the high delay sensitivity of real time services represented by class 1. The class 1 packets to be processed by a processor resource initially allocated for processing class 4 packets represent new arriving calls. Any new arriving packets that belong to calls already being processed by the processor resource initially allocated to process class 1 are not processed by the reallocated processor resource initially allocated for processing class 4 packets.

The 82% of class 4 TP resources are thus made available based on a movable boundary scheme. In such a scheme, arriving class 1 packets (packets of new calls) are allocated resources from class 1 TP resources. When all class 1 TP resources become busy, arriving class 1 packets are now allocated idle class 4 TP resources, where these arriving packets have access to 82% of class 4 TP resources.

Thus, effectively, when all class 1 TP resources are busy, the boundary of class 1 is stretched to include the 82% of class 4 TP resources. So the total number of TP units available upon reallocation for processing class 1 packets in this case would be class 1 TP resources initially allocated to process class 1 packets and 82% of class 4 TP resources reallocated to process class 1 packets. Now if arriving class 1 packets find all class 4 TP resources busy, then the on-going processing of class 4 packets will be halted as necessary to make the TP resources available to class 1 packets. This scheme is used here because class 4 traffic is much less sensitive to delay than is class 1 traffic. That is, on-going processing of class 4 packets is halted so as to accommodate the required bandwidth for the arriving class 1 traffic.

For example, assume that an arriving class 1 call requires 64 kb/s, thus class 4 resources should be reallocated so that they can accommodate the required bandwidth of 64 kb/s. If it so happens that class 4 resources are initially allocated for class 4 calls with a total bandwidth requirement of 128 kb/s, then a TP resource BW to process 64 kb/s needs to be reallocated to accommodate the arriving class 1 call.

Class 4 packets whose on-going processing is halted are put ahead of other class 4 packets in the queue of class 4 packets. Such packets are tagged so as to indicate the remaining processing time for each packet. As soon as enough TP resources become idle, the queued class 4 packets will be allocated to the idle resources, where processing of each packet will resume from the point where it was interrupted. The remaining processing time thus can be stored in the tag within the packet.

The processor 27 can comprise, for example, the Force Computer CPCI 6750 compact PCI processor card. It has a 400 MHz Power PC 750 and two PCI Mezzanine Card (PMC) slots. Thus the processor cycle is 1/400=2.5 nsec, which represents the time to execute an instruction. For the overflow case where class 4 TP resources are handling both class 1 and class 4 packets (a multitasking case), if the processor 27 visits the class 4 task (queue) for 1 ms, then based on the allocated bandwidth ratio for class 1 and class 4 packets, namely, 82/18=4.5, the processor 27 will visit the class 1 task for 4.5 ms. In such a case, the number of instructions of class 4 that will be executed during each visit is 1 ms/2.5 nsec=400,000 instructions. And for class 1 packets the number of instructions executed will be 4.5 ms/2.5 nsec=1,800,000 instructions.

Turning now to the other UMTS packet classes, the SGSN delay objectives for class 2 services is 50 ms whereas the SGSN delay objectives for class 3 services is 80 ms. Because class 3 services are more delay tolerant than class 2 services, a movable boundary strategy similar to that described for class 1 and class 4 traffic can be used in processing the class 2 and class 3 packets. For classes 2 and 3, the ratio of the delay tolerances is 50/80. Therefore, the ratio of the resources to be allocated to class 2 packets is 1/ratio=8/5. Thus, the number of units of processor resources to be allocated to class 2 traffic is $a_2=8/5 * a_3$, where $a_3$ is the number of units of processor resources allocated to class 3 traffic. If there are two TP units, where one TP unit is allocated for each class type, then the amount of resources that will be reallocated to class 2 traffic is found by solving the following two equations: $a_2+a_3=2$ TP units and $a_2=8/5*a_3$. Solving these two equations yields: $a_2=1.23$, $a_3=0.77$.

If one TP is initially allocated for class 2 traffic, then 23% of the TP resource initially allocated for class 3 can be reallocated for processing class 2 packets based on the movable boundary strategy. With respect to this scheme as applied to classes 2 and 3, however, the difference in the delay sensitivities for the two classes is not very large. In addition, the nature of class 3 traffic (i.e., interactive) requires an interactive response within a certain time. Thus, it is not desirable to halt on-going processing of class 3 traffic packets.

Therefore, an arriving packet of class 2 incoming calls will be allocated idle resources from the class 2 TP resource and 23% of the available (idle) portion of the class 3 TP resource. If all class 2 and 23% of class 3 TP resources are busy, though, on-going processing of class 3 packets is not halted. Instead, arriving class 2 packets of new incoming calls will be placed in the queue for class 2. The status of class 2 and class 3 TP resources are monitored continuously to see if they are idle or busy.

If an arriving class 3 packet of a new incoming class finds all of the class 3 TP resource busy, then it will have to wait in the queue, and as soon as enough of the TP resource becomes idle, it will be allocated that TP bandwidth. Halting on-going processing of class 3 packets is not feasible because doing so would increase the time class 3 packets have to wait to be processed, which is not desirable given that the delay tolerance for class 3 traffic is not very large.

All packets regardless of class can be tagged with the class to which they belong. Thus, class 2 packets can contain a class number with, for example, a value of 2. This tagging serves to distinguish between class 2 and class 3 packets. It also serves to prevent class 2 packets being allocated more than 23% of class 3 resources.

For the overflow case (i.e., the processing threshold is exceeded), if the processor 27 visits the class 2 task (queue) for 1 ms, then based on the bandwidth ratio for class 3 and class 2, namely, 77/23=3.3, the TP processor will visit class 3 for 3.3 ms.

The number of instructions of class 2 that will be executed during each visit is 1 ms/2.5 nsec=400,000 instructions. And for class 3 packets, the number of instructions executed will be 3.3 ms/2.5 nsec=1,320,000 instructions.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims.

The invention claimed is:

1. A controller for a packet radio network comprising:
a processor comprising a plurality of processor resources for processing a plurality of packet classes, each packet class having a different delay sensitivity associated therewith;
said processor allocating to each packet class at least a portion of at least one processor resource based on the delay sensitivities;
wherein said processor resources has a respective processing threshold; wherein said processor initially allocates each processor resource to a respective packet class; wherein said processor determines based upon arriving packets whether at least one processor resource will exceed its processing threshold, thereby defining at least one overloaded processor resource; and wherein said processor reallocates at least a portion of at least one processor resource to process packets for the at least one overloaded processor resource, thereby defining at least one reallocated processor resource;
wherein the at least a portion of at least one processor resource reallocated to process packets for the at least one overloaded processor resource comprises a portion determined based on the delay sensitivity associated with the packet class processed by said at least one overloaded processor resource and the delay sensitivity associated with the packet class initially to be processed by said at least one reallocated processor resource.

2. A controller for a packet radio network comprising:
a processor comprising a plurality of processor resources for processing a plurality of packet classes, each packet class having a different delay sensitivity associated therewith;
said processor allocating to each packet class at least a portion of at least one processor resource based on the delay sensitivities;
wherein said processor resources has a respective processing threshold; wherein said processor initially allocates each processor resource to a respective packet class; wherein said processor determines based upon arriving packets whether at least one processor resource will exceed its processing threshold, thereby defining at least one overloaded processor resource; and wherein said processor reallocates at least a portion of at least one processor resource to process packets for the at least one overloaded processor resource, thereby defining at least one reallocated processor resource;

wherein the at least a portion of at least one processor resource reallocated to process packets for the at least one overloaded processor resource is determined based on a ratio R of a first numerical value corresponding to the delay sensitivity associated with the packet class processed by said at least one overloaded processor resource and a second numerical value corresponding to the delay sensitivity associated with the packet class initially to be processed by said at least one reallocated processor resource.

3. A controller according to claim 2 wherein the at least one reallocated processor resource is initially for a packet class having a lower delay sensitivity than a packet class of the at least one overloaded processor resource.

4. A controller claim 2 wherein the at least a portion of at least one processor resource reallocated to process packets for the at least one overloaded processor resource is determined based on a solution to the following system of equations:

$R = a_1/a_2,$ $a_1 + a_2 = TP_{1+2};$ wherein, $a_1$ is a number of units corresponding to the at least one overloaded processor resource $a_2$ is a number of units corresponding to the at least one reallocated processor resource; and $TP_{1+2}$ is a total number of units.

5. A controller for a packet radio network comprising:
a processor comprising a plurality of processor resources for processing a plurality of packet classes, each packet class having a different delay sensitivity associated therewith;
said processor allocating to each packet class at least a portion of at least one processor resource based on the delay sensitivities;
wherein said processor resources has a respective processing threshold; wherein said processor initially allocates each processor resource to a respective packet class; wherein said processor determines based upon arriving packets whether at least one processor resource will exceed its processing threshold, thereby defining at least one overloaded processor resource; and wherein said processor reallocates at least a portion of at least one processor resource to process packets for the at least one overloaded processor resource, thereby defining at least one reallocated processor resource;
wherein said processor halts on-going processing of packets belonging to the packet class initially to be processed by said at least one reallocated processor to thereby ensure that the at least a portion of at least one processor resource reallocated to process packets for the at least one overloaded processor resource is available to process packets for the at least one overloaded processor resources.

6. A controller according to claim 5 wherein said processor tags packets whose on-going processing has been halted.

7. A controller according to claim 6 wherein packets that have been tagged are queued for subsequent processing after having been tagged.

8. A controller for a packet radio network comprising:
a processor comprising a plurality of processor resources for processing a plurality of packet classes, each packet class having a different delay sensitivity associated therewith;
said processor allocating to each packet class at least a portion of at least one processor resource based on the delay sensitivities;
wherein said processor resources has a respective processing threshold; wherein said processor initially allocates each processor resource to a respective packet class; wherein said processor determines based upon arriving packets whether at least one processor resource will exceed its processing threshold, thereby defining at least one overloaded processor resource; and wherein said processor reallocates at least a portion of at least one processor resource to process packets for the at least one overloaded processor resource, thereby defining at least one reallocated processor resource;
wherein said processor tags arriving packets that are to be processed by said at least one reallocated processor and queues packets that have been tagged for subsequent processing when on-going processing of packets by said at least one reallocated processor has been completed.

9. A controller for a packet radio network comprising:
a processor comprising a plurality of processor resources for processing a plurality of packet classes, each packet class having a different delay sensitivity associated therewith, each processor resource having a respective processing threshold;
said processor initially allocating each processor resource to a respective packet class, determining based upon arriving packets where at least one processor resource will exceed its processing threshold defining at least one overloaded processor resource, and reallocating at least a portion of at least one processor resource to process packets for the at least one overloaded processor resource and thereby defining at least one reallocated processor resource;
said processor halting on-going processing of packets belonging to the packet class initially to be processed by said at least one reallocated processor when necessary to thereby provide the at least a portion of at least one processor resource for processing packets for the at least one overloaded processor resource;
said at least one reallocated processor resource initially allocated for a packet class having a lower delay sensitivity than a packet class of the at least one overloaded processor resource.

10. A controller according to claim 9 wherein said processor tags packets whose on-going processing has been halted; and wherein packets that have been tagged are queued for subsequent processing after having been tagged.

11. A controller according to claim 9 wherein the at least a portion of at least one processor resource reallocated to process packets for the at least one overloaded processor resource comprises a portion determined based on the delay sensitivity associated with the packet class processed by said at least one overloaded processor resource and the delay sensitivity associated with the packet class initially to be processed by said at least one reallocated processor resource.

12. A controller according to claim 9 wherein the at least a portion of at least one processor resource reallocated to process packets for the at least one overloaded processor resource is determined based on a ratio R of a first numerical value corresponding to the delay sensitivity associated with the packet class processed by said at least one overloaded processor resource and a second numerical value corresponding to the delay sensitivity associated with the packet class initially to be processed by said at least one reallocated processor resource.

13. A controller according to claim 12 wherein the at least a portion of at least one processor resource reallocated to process packets for the at least one overloaded processor resource is determined based on a solution to the following system of equations:

$$R=a_1/a_2,$$

$$a_1+a_2=TP_{1+2};$$

wherein, $a_1$ is a number of units corresponding to the at least one overloaded processor resource; $a_2$ is a number of units corresponding to the at least one reallocated processor resource; and $TP_{1+2}$ is a total number of units.

14. A method of allocating processor resources to process a plurality of packet classes carried by a packet radio network, each racket class having a different delay sensitivity associated therewith, each processor resource has a respective processing threshold; and
the method comprising:
allocating to each packet class at least a portion of at least one processor resource of a processor comprising a plurality of processor resources to process each packet class, the allocating being based on the delay sensitivities;
determining based upon arriving packets whether at least one processor resource will exceed its processing threshold defining at least one overloaded processor resource; and
reallocating at least a portion of at least one processor resource to process packets for the at least one overloaded processor resource, thereby defining at least one reallocated processor resource, wherein the at least one reallocated processor resource is initially for a packet class having a lower delay sensitivity than a packet class of the at least one overloaded processor resource.

15. A method according to claim 14 wherein the at least a portion of at least one processor resource reallocated to process packets for the at least one overloaded processor resource is determined based on a ratio R of a first numerical value corresponding to the delay sensitivity associated with the packet class processed by the at least one overloaded processor resource and a second numerical value corresponding to the delay sensitivity associated with the packet class initially to be processed by the at least one reallocated processor resource.

16. A method according to claim 15 wherein the at least a portion of at least one processor resource reallocated to process packets for the at least one overloaded processor resource is determined based on a solution to the following system of equations:

$$R=a_1/a_2,$$

$$a_1+a_2=TP_{1+2};$$

wherein, $a_1$ is a number of units corresponding to the at least one overloaded processor resource; $a_2$ is a number of units corresponding to the at least one reallocated processor resource; and $TP_{1+2}$ is a total number of units.

17. A method according to claim 14 further comprising halting on-going processing of packets belonging to the packet class initially to be processed by the at least one reallocated processor to thereby ensure that the at least a portion of at least one processor resource reallocated to process packets for the at least one overloaded processor resource is available to process packets of the at last one overloaded processor resource; tagging packets whose on-going processing has been halted; and queuing packets that have been tagged for subsequent processing.

18. A method according to claim 14 further comprising tagging arriving packets that are to be processed by the at least one reallocated processor and queuing packets that have been tagged for subsequent processing when on-going processing of packets by the at least one reallocated processor has been completed.

* * * * *